United States Patent
Pogrebinsky

(10) Patent No.: US 6,445,681 B1
(45) Date of Patent: Sep. 3, 2002

(54) METHOD FOR MEASURING DELAY PARAMETERS IN A NETWORK

(75) Inventor: Vladimir Pogrebinsky, Bat Yam (IL)

(73) Assignee: Vocaltec Communications Ltd., Herzeliya (IL)

(*) Notice: Subject to any disclaimer, the term of this patent is extended or adjusted under 35 U.S.C. 154(b) by 0 days.

(21) Appl. No.: 09/395,975

(22) Filed: Sep. 15, 1999

(51) Int. Cl.[7] .................................................. H04J 1/16
(52) U.S. Cl. ........................ 370/252; 370/389; 370/229
(58) Field of Search ................................. 370/235, 503, 370/252–3, 508, 509, 514, 516, 518, 519, 389, 392, 520, 229, 230, 230.1, 231; 455/67.1, 67.6, 1.15; 375/224, 354, 356, 359

(56) References Cited

U.S. PATENT DOCUMENTS

| | | | |
|---|---|---|---|
| 4,494,230 A | | 1/1985 | Turner |
| 5,280,629 A | * | 1/1994 | Lo Galbo et al. .......... 455/51.2 |
| 5,450,394 A | * | 9/1995 | Gruber et al. .............. 370/216 |
| 5,521,907 A | * | 5/1996 | Ennis, Jr. et al. .......... 370/252 |
| 5,612,949 A | * | 3/1997 | Bennett ...................... 370/253 |
| 5,878,032 A | | 3/1999 | Mirek et al. |
| 5,961,599 A | * | 10/1999 | Kalavade et al. .......... 709/224 |
| 6,031,818 A | * | 2/2000 | Lo et al. ..................... 370/216 |

OTHER PUBLICATIONS

Schulzrinne H. et al., "RTP: A Transport Protocol for Real-Time Applications", IETF RFC 1989, Jan. 1996.
Tannenbaum, Andrew S., "Computer Networks", Computer Networks, London, Prentice–Hall Inernational, GB, pp. 539–541.
Mills, "Network Time Protocol (Version 3) Specification, Implementation and Analysis", Network Working Group Request for Comments: 1305 (Mar. 1992).
Stephens, *TCP/IP Illustrated*, vol. 1, Chapter 21, entitled: "TCP Timeout and Retransmission", pp. 297–322 (1994).
H. Schulzrinne, et al., "RTP: A Transport Protocol for Real–Time Applications", Network Working Group, Request For Comments (RFC) 1889 (Jan. 1996).
Cottrell, et al., "Tutorial on Internet Monitoring at SLAC", Apr. 22, 1999 (18 pages).
C. Demichelis, "Instantaneous Packet Delay Variation Metric for IPPM", Network Working Group, Internet Draft (Jul. 1998).
V. Paxon, et al., "Framework for IP Performance Metrics", Network Working Group, Request for Comments: 2330 (May 1998).
G. Almes, et al., "A One–way Delay Metric for IPPM", Network Working Group, Internet Draft (May 1999).

* cited by examiner

*Primary Examiner*—Chau Nguyen
*Assistant Examiner*—Andy Lee
(74) *Attorney, Agent, or Firm*—Welsh & Flaxman LLC

(57) ABSTRACT

A method for measuring delay parameters in a packet switched network between node A and node B, each having a clock, is disclosed The method includes the steps of: measuring a first relative one way delay (ROWD1) from node A to node B, measuring a second relative one way delay (ROWD2) from nude B to node A and calculating the difference between the first and second relative one way delays for providing a relative one way delay (ROWD) parameter. Methods for improving TCP protocol and detecting congestion in a packet switched network using ROWD measurements are also provided.

14 Claims, 3 Drawing Sheets

METHOD FOR MEASURING DELAY PARAMETERS IN A NETWORK

FIELD OF THE INVENTION

The present invention is directed to monitoring data transmissions over networks, and in particular, to methods for monitoring data transmissions over asymmetric networks.

BACKGROUND OF THE INVENTION

Communications networks, such as the internet typically support applications such as telephony. In internet telephony, data is transmitted typically in the form of packets. The delay associated with packet transmission is known as a propagation delay. This propagation delay is typically measured by round trip delay and may be used in order to optimize network utilization.

For example, FIGS 1 and 2 illustrate an asymmetric network 20 having nodes A and B and data transmission between these nodes. In FIG. 1, the network is capable of transmitting 5 Kbit/sec from node A to Node and 3 Kbit/sec from node B to node A (indicated by solid line arrows 21).

When additional data is desired to be transmitted from node B to node A, for example, at 6 Kbit/sec, the network becomes overloaded, as it is only capable of transmitting at 3 Kbit/sec from node B to node A. As a result, packets sent from node B to node A become delayed, since they can not be transmitted in the proper time Each new packet sent from node B (indicated by broken line arrow 22) will wait at node B and will be transmitted only after all other previously sent packets. Transmission delay grows to a point where all intermediate buffers at node B become full and node B starts to drop packets, resulting in packet loss.

To overcome the problem of transmission loss, the network should be monitored to detect such a situation. This is typically done by monitoring the round trip lime (RTT) for each packet. For example, RTT may be measured at node A by an algorithm that typically: 1) sends a probe packet from Node A to Node B at time A1; 2) Node B receives this packet at time B1; 3) Node B sends a reply at time B2; and 4) node A receives a reply to the packet sent at (1) at time A2. RTT is then calculated in accordance with the equation:

$$RTT=(A2-A1)-(B2-B1)$$

This relation is expressed graphically as shown in FIG. 3. Resultant RTT graphs for FIG. 1 are shown in FIG. 4 and for FIG. 2 are shown in FIG. 5. In FIG. 4, RTT is constant, as the network is able to handle the packet transmissions. This is not so for FIG. 5, where RTT increases due to network overload and back-up of packets.

RTT measured at node B behaves similarly to that measured at node A. This may be problematic when applied to asymmetric networks. As exemplified in FIG. 2, there is a problem in packet transmission from node B to node A, but not from node A to node D. If measuring RTI, a network load problem will be detected at both Nodes A and B, when this is not the case, since the network load problem is only at node B.

This problem is overcome by measuring one-way delay. However, measurement of one-way delay exhibits drawbacks in that clocks at nodes A and B must be synchronized in accordance with protocols such as RFC 1305 Network Time Protocol as detailed in Mills, "Network Time Protocol (Version 3) Specification, Implementation and Analysis", Network Working Group, Request for Comments: 1306 (March 1997). This protocol is complicated as it requires distributed participation of a number of client/servers or peers arranged in a dynamically reconfigurable, hierarchically distributed configuration.

SUMMARY OF THE INVENTION

The present invention overcomes the problems associated with the conventional art by providing a simplified monitoring parameter based on relative one way delay between nodes in a network This measurement of relative one way delay does not require synchronization of the clocks with respect to each other at nodes A and B. As a result, of the present invention bitrate and bandwidth can be controlled with greater accuracy when compared to that of the conventional art.

In one aspect of the present invention, there is provided a method for measuring delay parameters in a packet switched network between node A and node B. Each node has a clock, which is not synchronized with the other. This delay parameters measuring method includes the steps of measuring a first relative one way delay (ROWD1) from node A to node B, measuring a second relative one way delay (ROWD2) from node A to node B and calculating the difference between the first and second relative one way delays for providing a relative one way delay (ROWD) parameter. The ROWD is provided by the following equation: ROWD=ROWD2−ROWD1.

In this manner, the stop of determining ROWD1 includes the steps of, node A sending to node B a first probe packet at a time A1, node B receiving the first probe packet at time B1, and calculating ROWD1 as ROWD1=R1−A1. Preferably, the step of determining ROWD2 includes the steps of: node A sending to node B a second probe packet at a time A2, node B receiving the second probe packet at time B2 and calculating ROWD2 as ROWD2=B2−A2.

In another aspect of the invention, an absolute parameter of one way delay (OWD) is calculated by subtracting a clock difference (CD) between the clocks of node A and node B from the ROWD and provided by the following equation:

$$OWD=ROWD-CD.$$

In another aspect of the present invention, there is provided a method for detecting congestion in a packet switched network by measuring ΔROWD The method includes steps associated with the delay parameters measuring method, detailed above, and the steps of, estimating a smoothed ROWD average $A_n$, estimating a smoothed ROWD Jitter $J_n$ and comparing the last measurement of ROWD to a dynamic threshold which threshold is a function of $A_n$ and $J_n$.

Preferably, the step of estimating $A_n$ is according to the following equation:

$$A_n^{-g} A_{n-1} \cdot \left(\frac{15}{16}\right) + ROWDn \cdot \frac{1}{16}$$

Preferably, the step of estimating $J_n$ is according to the following equation $$J_n^{-t} J_{n-1} \cdot \frac{4}{5} + |\Delta ROWD_x| \cdot \frac{1}{5}$$

Preferably, said dynamic threshold $T_d$ is vary according to following equation;

$$T_d = A_{n-1} + 3J_{n-1}$$

In another aspect of the invention congestion in the network is detected by analyzing growth of the ROWD in comparison to $T_d$.

In still another aspect of the invention, there is disclosed a method or improving bit rate control by Transmission Control Protocol(s) (TCP) in accordance with a relative one way delay (ROWD) parameter. The method includes steps associated with the delay parameters measuring method, detailed above, and the step of estimating the retransmission timeout value according to the last measured ROWD.

BRIEF DESCRIPTION OP THE DRAWINGS

Reference is now made to the attached drawings, where like reference numerals or characters indicate corresponding or like components. In the drawings.

DETAILED DESCRIPTION OF THE DRAWINGS

Figure 1:
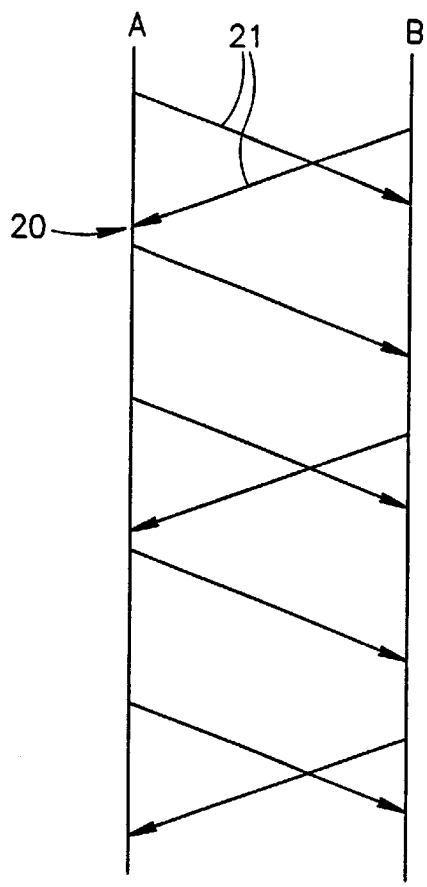
FIG. 1 is a diagram of a first example of an asymmetric network.
Figure 2:
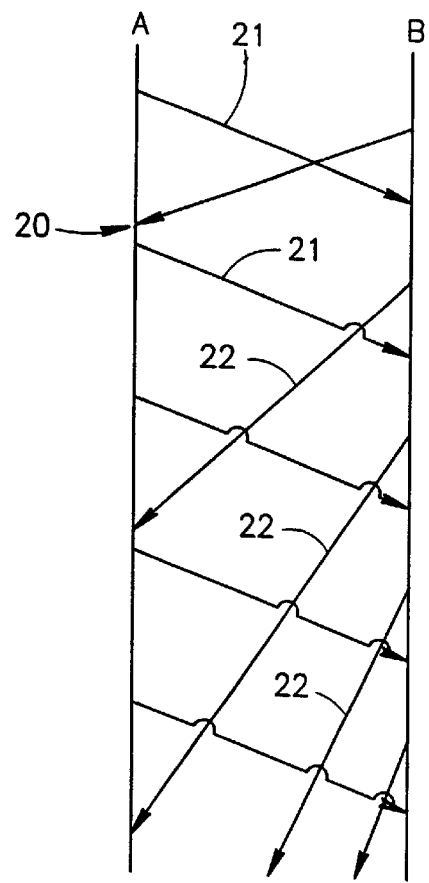
FIG. 2 is a diagram of a second example of an asymmetric network.
Figure 3:
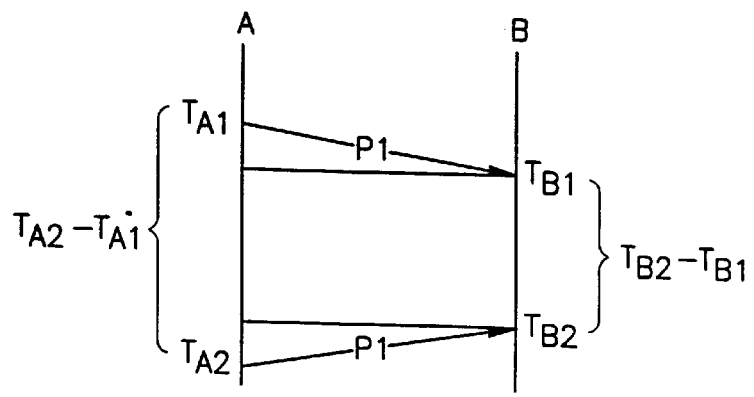
FIG. 3 is a diagrammatic illustration for calculating RTT.
Figure 4:
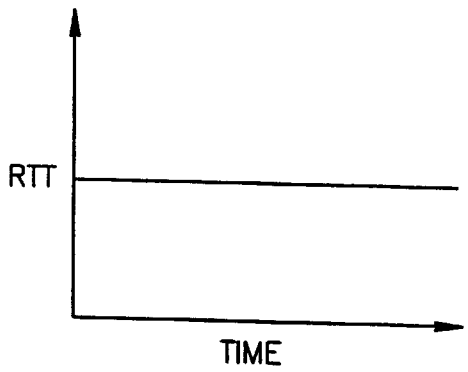
FIG. 4 is a chart of RTT over time for the network detailed in FIG. 1.
Figure 5:
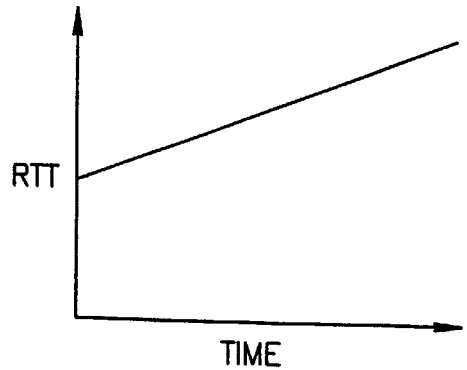
FIG. 5 is a chart of RTT over time for the network detailed in FIG. 2.
Figure 6:
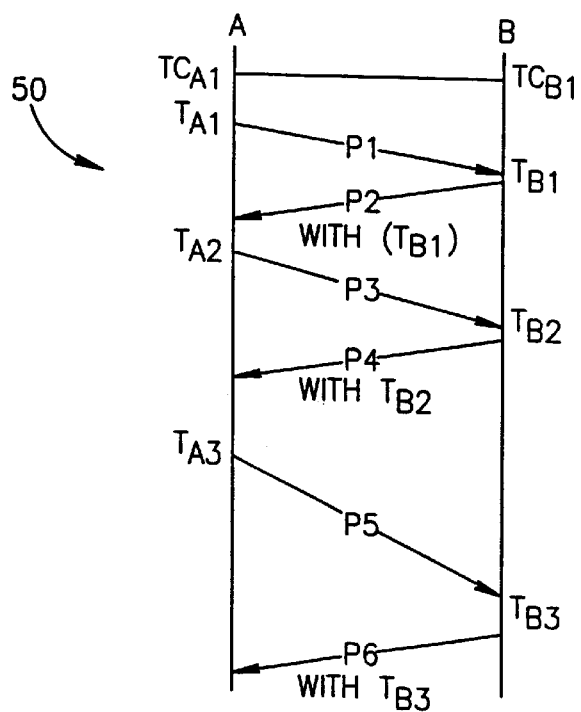
FIG. 6 is a diagram of the present invention.

The present invention is detailed in FIG. 6. In this figure, there is a packet switched network 50, having nodes A and B indicated as such. At each of these nodes are clocks, typically hardware clocks, that are preferably riot synchronized. As the clocks at the nodes are preferably not synchronized, there is a clock difference (CD) between them.

Initially, and for a proper understanding of the present invention, the assumptions should be made that Node A and Node B have hardware clocks, the packet switched network 50 is the internet and the probe packets are provided by a Real Time Transport Control Protocol (RTCP). When time is measured simultaneously, the clock at Node A shows $TC_{A1}$, and the clock at Node B shows $TC_{B1}$. For purposes of this example, a clock difference (CD) between the clock at Node A and the clock at Node B is defined as:

$$CD_{A2B} = TC_{B1} - TC_{A1}$$

In the same way, CD between the clock at Node B and the clock at Node A is expressed as:

$$CD_{B2A} = TC_{A1} - TC_{B1}$$

In FIG. 6, a first packet, preferably a probe packet (P1) is sent from Node A at time $T_{A1}$ to Node B, where it is received at time $T_{B1}$. At a slightly later time than time $T_{B1}$, a packet (P2) including the time $T_{B1}$, is sent from Node B, and arrives at Node A at some time later than $T_{A1}$. A third packet, preferably a probe packet (P3), is sent from node A at time $T_{A2}$ to Node B, where it is received at time $T_{B2}$. At a slightly later time than time $T_{B2}$, a packet (P4), preferably a probe packet, including the time $T_{B2}$, is sent from Node B, and arrives at Node A at a time intermediate times $T_{A2}$ and $T_{A3}$.

A fifth packet, preferably a probe packet (P5), is sent from node A at time $T_{A3}$ to Node 8, where is received at time $T_{B3}$. At a slightly later time than time $T_{B3}$, a pocket (P6), preferably a probe packet, including the Lime $T_{B3}$, is sent from Node B, and arrives at Node A at time later than $T_{A3}$. It is also preferred that the first (P1) and second (P2) packets, be of an RTCP protocol, the particular RTCP protocol being any conventional protocol.

The present invention takes advantage of the parameter relative one way delay (ROWD). This parameter is based on One Way Delay (OWD), and is expressed as:

$$ROWD - CD = OWD$$

Since CD ie constant, the relationship between ROWD and OWD can be expressed as:

$$\Delta ROWD = \Delta OWD$$

For example, in FIG. 6, $T_{CA1}=2000$, A1=2100, A2=2300, A3=2700, $T_{CB1}=8000$, B1 8200, B2=8500 and B3=9100. Based on these values, ACD is the absolute value of 8000–2000 or $6000 = T_{CB1-TCA1}$. Accordingly, the following relations are established:

ROWD1=B1–A1=8200–2100=6100

ROWD2=B2–A2=8500–2300=6200

ROWD3=B3–A3=9100–2700=6400

OWD1=(B1–A1)–(TCB1–TCA1)=(8200–2100)–(8000–2000)=100

OWD2=(B2–A2)–(TCB1–TCA1)=(8500–2300)–(8000–2000)=200

OWD3=(B3–A3)–(TCB1–TCA1)=(9100–2700)–(8000–2000)=400

Figure 7:
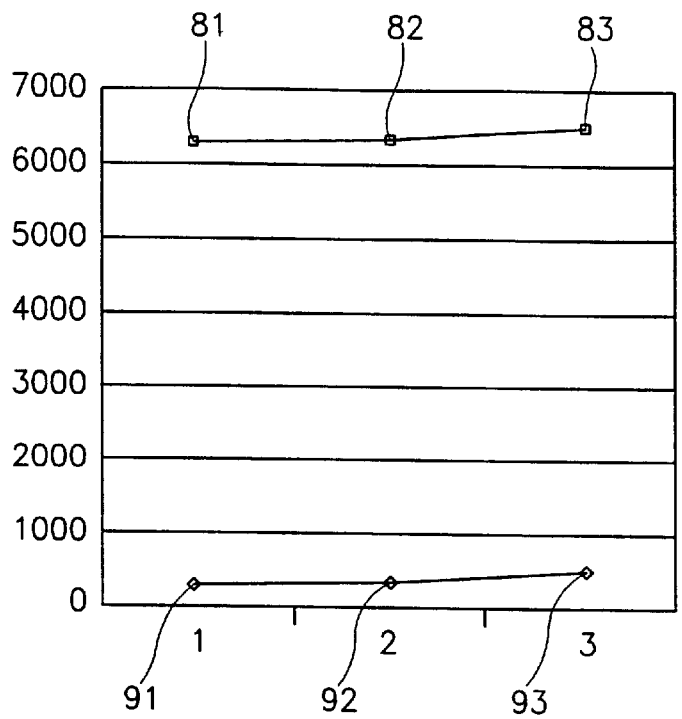
FIG. 7 is a graph of packet receipt versus time.

Turning also to FIG. 7, ROWD1 ROW1D3 are pinned as points 81-83, respectively and OWD1–OWD3 are plotted as points 91-83. While OWD is a useful metric for learning network behavior, it requires clock synchronization in order to obtain the time difference represented by $T_{CB1}-T_{CA1}$. Clock synchronization is complicated because, as discussed above, it requires synchronization involving complicated algorithms end requires distributed participation of a number of client/servers or peers arranged in a dynamically reconfigurable, hierarchically distributed configuration.

By using relative one way delay (ROWD), clock synchronization is not necessary. This is because the important value is a function of two relative one way delay measurements, and in particular, their difference, expressed $\Delta ROWD$. In accordance with the present invention, two examples utilizing relative one way delay parameter (ROWD) are now detailed.

EXAMPLE 1

Figure 8:
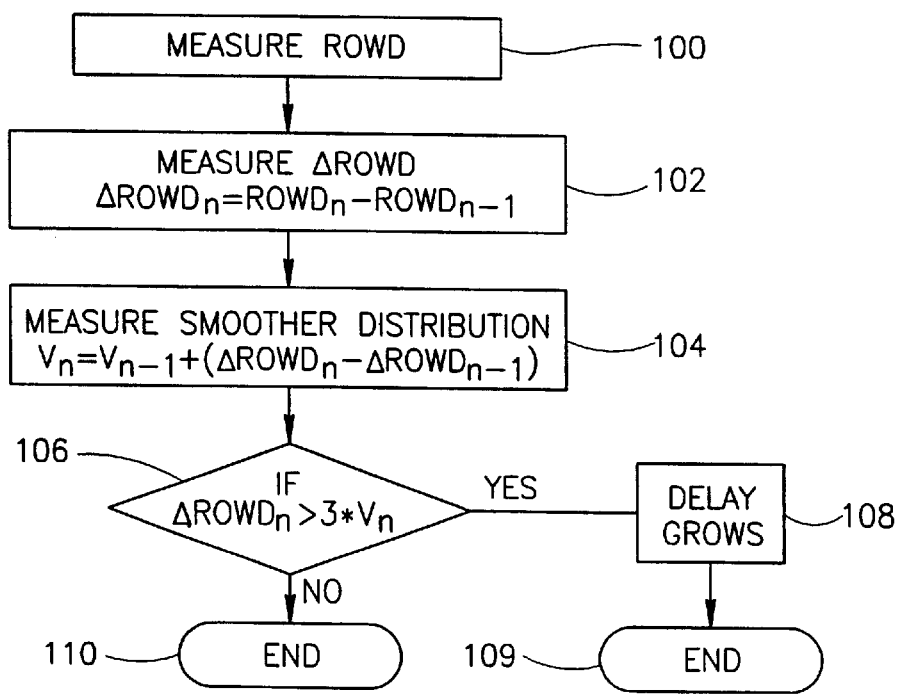
FIG. 8 is a flow chart detailing an exemplary operation using the relative one way delay as determined by the present invention.

Turning now to FIG. 8 there is detailed an exemplary operation for applying the relative one way delay parameter (ROWD) determined above. This exemplary operation is preferably an algorithm for detecting congestion in a packet switched network that employs the ROWD parameter.

Initially, at block 100, two relative one way delays (ROWD) are measured, in accordance with that detailed above. The relative one way delay parameter ($\Delta ROWD_n$) is then measured by obtaining the difference between the two ROWD values, at block 102. At block 104, a smoothed distribution is measured with the smoothed ROW) average $A_n$ is estimated as:

$$A_n = A_{n-1} \cdot \left(\frac{15}{16}\right) + ROWDn \cdot \frac{1}{16}$$

and a smoothed ROWD jitter $J_n$ is estimated as:

$$J_n = J_{n-1} \cdot \frac{4}{5} + |\Delta ROWD_n| \cdot \frac{1}{5}.$$

A comparison step, to check for delay growth is then performed at block 106. The comparison of the last measurement of ROWD with a dynamic threshold which is a function of $A_n$ and $J_n$ in accordance with the relation:

$$T_d = A_{n-1} + 3J_{n-1}$$

The congestion is detected according to the relation $ROWD_n > T_d$.

If the relation is true, at block 108, there is a delay growth detected. If the relation is not true, the function also ends at block 110. The algorithm is then repeated (or as many times as desired or necessary.

EXAMPLE 2

In Stephens, "TCP/IP Illustrated" Volume 1. Chapter 21, entitled: TCP Timeout and Retransmission pages 297–322 (1994), this chapter incorporated by reference herein in its entirety, it is explained how TCP protocol estimates retransmission timeout value (RTO). The following equations are applied to RTT measurement M, $$Err = M - A$$

$$RTO = A + 4D$$

where A is the smoothed RTT (as estimator of the average and smoothed in accordance with the relation:

$$A_n = A_{n-1} + g^* Err_n$$

D is the smoothed mean deviation it in accordance with the relation:

$$D_n = D_{n-1} + h^* (|Err_n - D_{N-1}|)$$

Err is the difference between the measured value Just obtained and the current RTT estimator.

Both A and D are used to calculate the next retransmission timeout (RTO). The gain "g" is for the average and is set to ⅛ (0.125). The gain for the deviation is "h" and is set to "0.25."

Here, Err is a difference between the measured value just obtained and the current RTT estimator, i.e., $Err_n = RTT_n - A_n$. Taking ROWD as an input instead of RTT will give Err the value of change in one way delay, i.e. $Err_n = ROWD_n \cdot A_n$. In this case, RTO will be based only on delay in the direction that TCP is influencing on. Delay variations in opposite direction affects RTT only but not ROWD. Thus this will make the TCP protocol much more stable on asymmetric networks.

Network monitoring (for controlling bit rate for example) may utilize $\Delta ROWD$ instead of $\Delta RTT$. This technique may greatly improve several protocols such as, for example, RFC 1889 from IETF, as detailed in Schulzrinne, et al., "RTP: A Transport Protocol For Real-Time Applications", Network Working Group-IETF, Request For Comments (RFC): 1889, January 1996, hereinafter referred to as "RFC 1889".

As detailed above, OWD was never used directly, but rather, the differences in OWD were used. In such algorithms for example RFC 1889 as detailed above, differences of OWD may be substituted by ROWD, since $\Delta ROW1) = \Delta OWD$, as detailed above:

In the above example the following optimizations may be applied:

1. Instead of sending an answer for each packet, Node B may estimate accumulators internally and send smoothed values once in a while to Node A.
2. Although clock rate difference may usually be ignored, it is preferred to use relatively close in time ROWD measurements (not more than several hours between measurements) for $\Delta ROWD$ estimation.

The methods, examples and apparatus disclosed herein have been described without reference to specific hardware or software. Rather, the methods and apparatus have been described in manner sufficient to enable persons of ordinary skill in the art to readily adapt commercially available hardware and software as may be needed to reduce any of the embodiments of the present invention to practice without undue experimentation and using conventional techniques.

While preferred embodiments of the present invention have been described, so as to enable one of skill in the art to practice the present invention, the preceding description is intended to be exemplary only. It should not be used to limit the scope of the invention, which should be determined by reference to the following claims.

What is claimed is:

1. A method for measuring delay in a packet switched network between node A and node B, each having a clock comprising the steps of:

measuring a first relative one way delay (ROWD1) from node A to node B by using said clocks at node A and node B which are unsynchronized with respect to each other;

measuring a second relative one way delay (ROWD2) from node A to node B by using said clocks at node A and node B which are unsynchronized with respect to each other, and determining relative one way delay (ROWD) parameter by subtracting said first relative one way delay from said second relative one way delay in accordance with the following equation:

$ROWD = ROWD2 - ROWD1$.

2. The method of claim 1, wherein the step of determining ROWD1 comprising the steps of:

node A sending to node B a first probe packet at a time A1;

node B receiving said first probe packet at time B1; and calculating ROWD1 as ROWD1=B1−A1.

3. The method of claim 1, wherein the step of determining ROWD2 comprising the steps of:

node A sending to node B a second probe packet at a time A2;

node B receiving said second probe packet at time B2; and calculating ROWD2 as ROWD2=B2−A2.

4. The method of claim 1, wherein said packet switched network is the Internet.

5. The method of claim 2, wherein said first probe packet includes packets of Real Time Transport Control Protocol (RTCP).

6. The method of claim 1, wherein an absolute parameter of one way delay (OWD) Is calculated by subtracting a clock difference (CD) of said clocks of said node A and said node B from said ROWD, which calculation is provided by the following equation:

$$OWD = ROWD \cdot CD.$$

7. The method of claim 1, wherein the difference between consecutive measurements of ROWD (ΔROWD) is used for learning a network behavior.

8. The method of claim 3, wherein said second probe packet includes packets of Real Time Transport Control Protocol (RTCP).

9. A method for detecting congestion in a packet switched network by measuring relative one way delay (ROWD), comprising the steps of:
measuring a first relative one way delay (ROWD1) from node A to node B;
measuring a second relative one way delay (ROWD2) from node A to node B;
calculating the difference between said first and second relative one way delays for providing a relative one way delay (ROWD) parameter by using the following equation:

$$ROWD = ROWD2 - ROWD1;$$

estimating a smoothed ROWD average $A_n$;
estimating a smoothed ROWD jitter $J_n$; and
comparing the last measurement of ROWD with a dynamic threshold, said dynamic threshold being a function of $A_n$ and $J_n$ for detecting said congestion.

10. The method of claim 9, wherein the step of estimating $A_n$ is according to the equation:

$$A_n = A_{n-1} \cdot \left(\frac{15}{16}\right) + ROWDn \cdot \frac{1}{16}.$$

11. The method of claim 9 wherein the step of estimating $J_n$ is according to the equation:

$$J_n = J_{n-1} \cdot \frac{4}{5} + |\Delta ROWD_n| \cdot \frac{1}{5}.$$

12. The method of claim 9 wherein said dynamic threshold $T_d$ is vary according to the equation;

$$T_d = A_{n-1} + 3J_{n-1}.$$

13. The method of claim 11, wherein the step of detecting congestion includes analyzing the growth of said ROWD in comparison to $T_d$.

14. A method for improving bit rate control of Transmission Control Protocols (TCPs) by employing a relative one way delay (ROWD) parameter comprising the steps of:
providing clocks at node A and node B, said clocks unsynchronized with respect to each other;
measuring a first relative one way delay (ROWD1) from node A to node B;
measuring a second relative one way delay (ROWD2) from node A to node B;
determining the difference between said first and second relative one way delays for providing a relative one way delay (ROWD) parameter by using the following equation:

$$ROWD = ROWD2 - ROWD1;$$

and
estimating the retransmission timeout value in accordance with a last measured ROWD.

* * * * *